United States Patent [19]

Cessna

[11] Patent Number: 5,853,901
[45] Date of Patent: Dec. 29, 1998

[54] LIGHTWEIGHT DECORATIVE PAPER PRODUCTS FOR PRESSURE LAMINATES AND METHOD FOR FORMING THE SAME

[76] Inventor: Frank L. Cessna, 4412 Riverview Ave., Middletown, Ohio 45042

[21] Appl. No.: 772,067

[22] Filed: Dec. 19, 1996

[51] Int. Cl.$^6$ .............................. B32B 21/08; B32B 27/04
[52] U.S. Cl. ........................................ 428/537.5; 428/530
[58] Field of Search .................................. 428/530, 537.5

[56] References Cited

U.S. PATENT DOCUMENTS

| | | | |
|---|---|---|---|
| Re. 31,373 | 9/1983 | Ungar et al. .............................. | 156/222 |
| 3,445,327 | 5/1969 | Fuerst ...................................... | 161/264 |
| 3,525,664 | 8/1970 | Hale et al. ............................... | 161/162 |
| 3,798,117 | 3/1974 | Guertin et al. ........................... | 161/251 |
| 3,940,538 | 2/1976 | Palazzolo et al. ....................... | 428/318 |
| 3,975,572 | 8/1976 | Power ..................................... | 428/452 |
| 4,093,766 | 6/1978 | Scher et al. ............................. | 428/165 |
| 4,154,882 | 5/1979 | Ungar et al. ............................. | 428/165 |
| 4,505,974 | 3/1985 | Hosler .................................... | 428/329 |
| 4,636,443 | 1/1987 | Jaisle et al. ............................. | 428/481 |
| 4,689,102 | 8/1987 | Prawdzik et al. ....................... | 156/235 |
| 4,789,604 | 12/1988 | van der Hoeven et al. ........... | 428/503 |
| 4,880,689 | 11/1989 | Park et al. .............................. | 428/143 |
| 5,047,282 | 9/1991 | Mier ....................................... | 428/204 |
| 5,154,982 | 10/1992 | Cessna ................................. | 428/537.5 |
| 5,180,472 | 1/1993 | Cessna ................................... | 162/138 |
| 5,258,235 | 11/1993 | Mehta et al. ............................. | 428/530 |
| 5,348,621 | 9/1994 | Rudy ....................................... | 162/100 |
| 5,425,986 | 6/1995 | Guyette ................................... | 428/283 |

*Primary Examiner*—Mukund J. Shah
*Assistant Examiner*—Deepak R. Rao
*Attorney, Agent, or Firm*—Dinsmore & Shohl LLP

[57] ABSTRACT

A lightweight paper face sheet for laminated decorative paper products, wherein the face sheet has a ream weight of about 25 lbs (about 41 gsm) or less and is formed from a face furnish substantially free of dye, pigments and rutile titanium. The paper face sheet has at least one finished surface which is receptive to post-paper making application of a decorative layer such as by ink printing. A lightweight paper overlay sheet is provided having a ream weight of about 15 lbs (about 25 gsm) or less while retaining good tensile and tear strength. The overlay sheet is formed from a furnish substantially free of dye, pigments and rutile titanium. In a preferred process, the decorative layer of the laminated decorative paper product is provided on at least one finished surface of the face sheet, prior to saturation of both the face and overlay sheets with resin. The saturated face and overlay sheets are thereafter cured and then laminated as desired to form a high pressure laminated decorative paper product. In a preferred arrangement, the paper face sheet is provided with a ream weight of about 20 lbs (33 gsm) or less, while the overlay sheet is provided with a ream weight of about 10 lbs (about 17 gsm) or less.

35 Claims, 2 Drawing Sheets

LIGHTWEIGHT DECORATIVE PAPER PRODUCTS FOR PRESSURE LAMINATES AND METHOD FOR FORMING THE SAME

TECHNICAL FIELD

This invention relates to paper products for use in high pressure paper laminates, and, more particularly to an improved combination of lightweight paper face and overlay sheets and method for providing more adaptable, lightweight, and economical laminated decorative paper products substantially free of undesirable colorants and additives such as titanium and dyes.

BACKGROUND ART

In the past, high pressure laminated paper products have been utilized for a variety of decorative and functional applications such as kitchen countertops, wall surfaces, and the like. Heretofore, these high pressure paper products have been relatively expensive and complex to manufacture, as heavy weighted (i.e., ream weight) was required to retain relatively high volumes of rutile titanium and melamine to provide the desired decorative features (e.g., color and pattern) with sufficient strength and rigidity. As is generally known in the industry, and as used herein, the term "ream weight" is utilized to connote the basis weight of a stack of 500 sheets of the decorative paper product, with each sheet measuring 24"×36". Basis weight is also often expressed in grams per square meter in metric units.

Rutile titanium was often provided in the form of titanium oxide, and was added to the paper product along with desired colorants to assist in fade control and to minimize yellowing problems. Moreover, colorants have generally been provided in the form of heavy metal substances such as chrome or the like, and, more recently, color dyes to address toxicity and environmental problems involved in processing the heavy metal colorants. The rutile titanium is relatively expensive and, thereby, adds significantly to the cost of these paper products.

Additionally, heretofore, where relatively dark or bright colors were desired, heavier concentrations of the color pigments and titanium additives were required. This heavy color "loading" also required relatively heavy basis weight of the paper itself to receive and hold such heavier concentrations. The color loading, however, also made the finished products more susceptible to problems such as chalking and rub-off in use, further limiting their acceptance and applicability. Often paper having a ream weight in a range of between 50 and 90 lbs. (24"×36"×500) (i.e., between about 80 and 150 grams per square meter or gsm) was required to handle this pigment loading and other additives. As is also understood, melamine formaldehyde must also be added to the sheets to provide the stiffness and binder required for the high pressure laminating process. The heavier ream weight papers also required more melamine for saturation, further adding to the expense and process complexity of these products.

In addition to the base paper layer which generally carried the pigmentation or colorant desired, conventional pressure laminates also generally included an alpha or overlay layer, also saturated with melamine formaldehyde for rigidity and wet strength. The alpha layer is conventionally a ream weight in a range of from about 22 to 32 lbs (i.e., between about 38 and 52 gsm), and often included an aluminum oxide additive to provide an abrasive finish to the laminated product. Exemplary patents showing various paper laminates and high pressure laminating procedures include U.S. Re. Nos. 31,373 (Ungar et al.), 4,093,766 (Scher et al.), 4,154,882 (Ungar et al.), 4,505,974 (Hosler), and 5,047,282 (Mier).

In addition to cost and processing complexities attendant with the production of these various paper layers for laminating, as well as the often complex pulp furnishes and additives required, manufacturers of these decorative paper products also faced the daunting task of color matching and inventory control of these highly pigmented custom products. Often, the paper making process would have to be started, then stopped for obtaining color samples for time consuming off-machine color matching tests. Colorants would thereafter be modified to accommodate for unacceptable color results, often necessitating repeated startups and interruptions, waste and overall inefficiencies.

As can be also understood, following production of a particular color or decorative pattern of paper on a particular paper making machine, the manufacturer would have to appropriately clean the machine to minimize the potential of unwanted color problems with subsequent runs, and would also have to carefully plan the various color "runs" to match customer demand and inventory requirements. Moreover, because many of the applications for laminated decorative paper products require the ability for post-forming (e.g., bending into tight radiuses or molded patterns) without cracking, the heavier weighted decorative papers could present some significant waste problem where cracking would undermine the desired ornamental or functional characteristics of the products.

Also, because many of the decorative laminate products were used for kitchen counters and other ornamental and functional applications facing relatively rough daily use including cleaning products and/or environmental stresses, heavy pigment loading and a necessity for large amounts of additives such as rutile titanium created sometimes insurmountable problems in the industry. As is generally known to those of ordinary skill in the paper making technologies, heavier papers generally also take more time in the paper making process, further complicating matters and increasing costs.

Consequently, there has been a continuing need for improved methods and decorative layer paper laminates for use in forming laminated decorative paper products. While the paper industry has traditionally faced these problems by providing relatively heavy ream weight paper for handling the pigment loading and additives for minimizing color fade, bleeding, chalking, and the like, the continuing problems of color matching, pigment control, high costs, complexity, inefficiencies and post forming limitations have remained. Despite significant prior work and recognition of all of these problems, the industry has heretofore been relatively unsuccessful in providing any significant improvements in these products or procedures along these lines.

DISCLOSURE OF THE INVENTION

It is an object of this invention to obviate the above-described problems.

It is another object of the present invention to provide an improved method for forming a laminated decorative paper product which includes providing improved lightweight paper face and overlay sheets which are substantially free of dye, pigments and rutile titanium.

It is yet another object of the present invention to provide an improved method for forming a laminated decorative paper product which includes providing an improved lightweight paper face sheet having a ream weight of approximately 25 lbs (about 41 gsm) or less and being substantially free of dye, pigments and rutile titanium, and which includes at least one finished surface receptive to subsequent decorative printing.

It is yet another object of the present invention to provide an improved paper face and overlay sheet combination, wherein both sheets are relatively lightweight and free of dye, pigments and rutile titanium.

It is also an object of the present invention to provide an improved paper face sheet for use in laminated decorative paper products which is extremely lightweight, and which can be produced and stored in relatively large quantities for use in a variety of different decorative applications by selective ink printing as desired.

It is also an object of the present invention to provide an improved face and overlay sheet combination for use in pressure laminated decorative paper products which can be produced in large quantities for substantially universal use in a wide variety of different decorative applications, wherein the paper making procedure for the face sheet can be effectively independent of and substantially unaffected by the selective application of a subsequent decorative layer to be added to a finished surface thereof.

It is an additional object of this invention to provide an improved paper face and overlay sheet combination, and method for forming laminated decorative products, which simplifies the paper making and laminated product processes, and provides substantially unbounded adaptability and flexibility in providing decorative products via extremely lightweight and cost effective papers.

It is also an object of the present invention to provide a lightweight paper face and overlay sheet combination, wherein the face and overlay sheets can be produced in a relatively stock or universal manner relatively free of colorants and colorant additives such as rutile titanium, whereby the production and inventory complexities associated with traditional pigmented paper products for high pressure laminates can be obviated.

In accordance with one aspect of the present invention, a lightweight paper face sheet is provided for laminated decorative paper products, wherein the face sheet has a ream weight of about 25 lbs (about 41 gsm) or less and is formed from a face furnish substantially free of dye, pigments and rutile titanium. The paper face sheet has at least one finished surface which is receptive to post-paper making printing of a decorative layer such as by ink printing. A lightweight paper overlay sheet is provided having a ream weight of about 15 lbs (about 25 gsm) or less while retaining good tensile and tear strength. The overlay sheet is formed from a furnish substantially free of dye, pigments and rutile titanium. In a preferred method of the present invention, the decorative layer of the laminated decorative paper product is provided on at least one finished surface of the face sheet, prior to saturation of both the face and overlay sheets with resin. The saturated face and overlay sheets are thereafter cured and then laminated as desired to form a laminated decorative paper product. In a preferred arrangement, the paper face sheet is provided with a ream weight of about 20 lbs. (24"×36"×500) (about 33 gsm) or less, while the overlay sheet is provided with a ream weight of about 10 lbs. (24"×36"×500) (about 17 gsm) or less, and more preferably about 8 lbs (about 13 gsm).

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF PREFERRED EMBODIMENTS OF THE INVENTION

Figure 1:
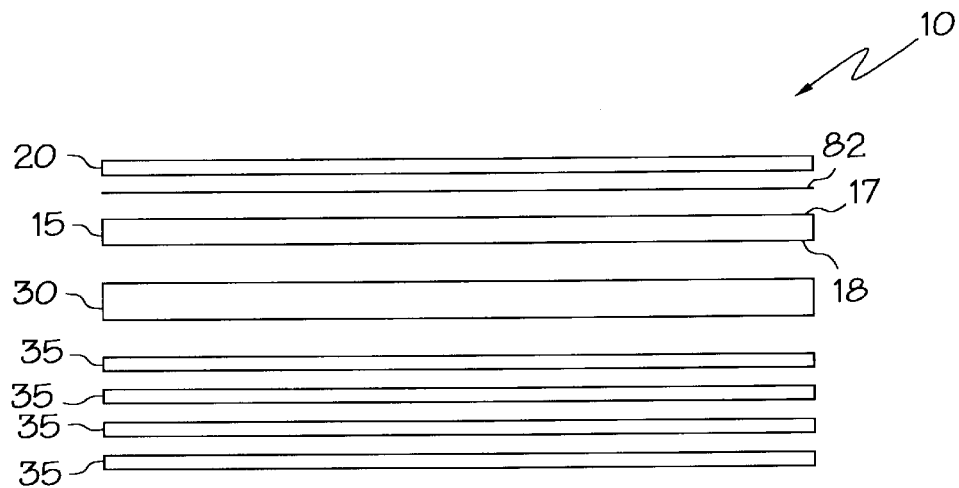
FIG. 1 is an exploded schematic view of a face sheet and alpha overlay sheet combination of the present invention, shown with exemplary barrier and backer paper sheets for a laminated paper product.

Referring now to the drawings in detail, wherein like numerals indicate the same elements throughout the views, FIG. 1 shows a laminated decorative paper product 10 in a schematic, partially exploded arrangement. Particularly, a face sheet 15 of the present invention is shown as including an upper surface 17 and a lower surface 18, and wherein an overlay sheet 20 is arranged in generally overlying condition above upper surface 17. As will be mentioned below in greater detail, a typical laminated decorative paper product made in accordance herewith will also generally include a barrier sheet 30 to impart opacity to face sheet 15, and a plurality of backer sheets 35 to provide further support and substance to the overall laminated product 10.

Figure 2:
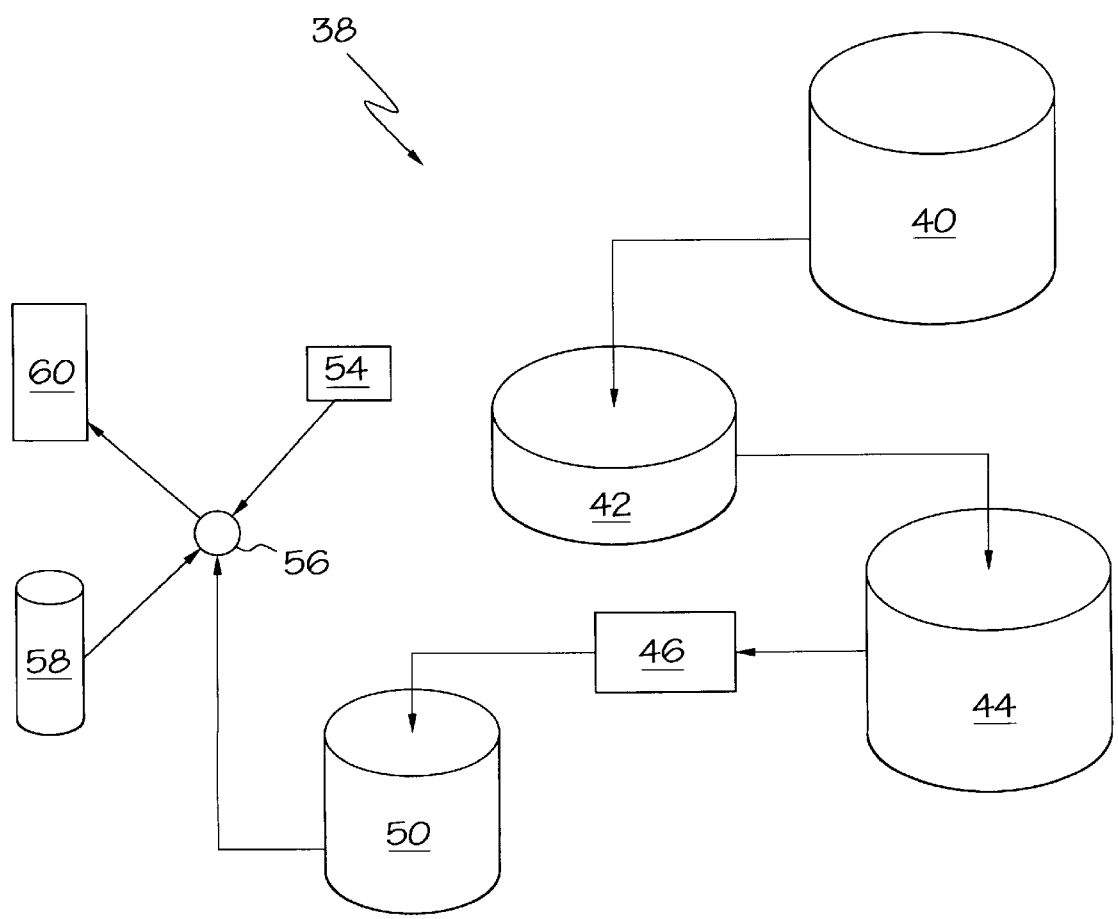
FIG. 2 is a simplified schematic view of an exemplary wet end of a paper making procedure in which the present invention can be implemented.

FIG. 2 shows a simplified schematic view of an exemplary wet end 38 of a paper making process which can be utilized to implement the present invention. It will be noted that the overall set-up of the wet end is relatively similar to traditional paper making procedures, however, as will be understood by those of ordinary skill upon review of the teachings herein, the present invention provides a combination face sheet and overlay sheet quite unlike decorative paper products known heretofore. Particularly, as mentioned above, face sheet 15 of the present invention is to be provided from a pulp furnish substantially free of dye, pigments and rutile titanium. Selection of the pulp furnish and the level of melamine formaldehyde is important in providing the improved lightweight face sheet of the present invention.

In the present invention, virgin pulp is provided to a hydro-pulper 40 without the traditional addition of titanium dioxide. In a preferred embodiment, the face furnish will comprise approximately 30% of bleached softwood such as Hinton High Bright (Hinton Pulp and Paper in Canada) or Domtar Q-90, such as available from Domtar Pulp and Paper in Canada. Particularly, it is desired that the face furnish comprise pulp which develops its strength values with minimum refining, thereby allowing improved saturating characteristics of the completed paper. The face furnish should also include approximately 35% of a mercerized hardwood such as Sulphatate-H-J (such as available from ITT Rayonier Forest Products of Canada and U.S.A.). This portion of the furnish improves the bulk and absorbency of the finished product, and the sulphate H-J embodiment of this pulp is particularly desired for its ability to help minimize streaking of resin during the later melamine saturation process. Particularly, after the face paper sheet is made on the paper making machine, it will be decorated as discussed herein, then fully saturated with melamine formaldehyde, which, once cured, imparts stiffness to the sheet and allows it to be bonded to other sheets during the pressure laminating procedures. It should be noted that in paper making procedures heretofore, relatively significant waste of decorative paper products (e.g., between 18 and 25% waste) was often encountered by decorative laminate product producers where unacceptable shrinkage or non-uniformity resulted from resin streaking after the face sheet was passed through the melamine treater and then cured.

The remaining approximately 35% of the face furnish preferably comprises eucalyptus pulp to help improve formation of the paper. This preferred furnish mixture requires modest refining while providing a superior product. It should be noted that the particular percentages of the preferred embodiments set forth herein are not critical to the provision of the improved lightweight paper face sheet of the present invention, and other furnish compositions can be substituted by those skilled in the art. For example, the face furnish could be provided of essentially 100% bleached softwood such as the Hinton High Bright pulp discussed above.

Once the pulp is provided to the hydro-pulper 40 and passed through the beater (42) as necessary, it moves on to the hold chest 44 prior to passing through the refiner (46) on its way to machine chest 50. Utilizing relatively standard paper making machinery, the furnish is then drawn into fan pump 56, where it can be mixed with relatively small amounts of a wet strength resin 58 such as Paramel HE (such as available for Hercules, of Wilmington, Del.) and, possibly, some alum for pH control as necessary. For example, in a preferred embodiment, a small amount (such as between about 1.25 and 2% by weight) of wet strength resin additive might preferably be added to eliminate breakage of the paper web during saturation in the melamine bath portion of the process, as discussed below.

Once wet strength additive (e.g., 58) and any pH control additives (e.g., 54) are mixed in at fan pump 56, the face furnish proceeds to head box 60 of the paper making machine. Thereafter, the furnish is introduced into the head box where it can be deposited as a web on the paper making machine, such as a Fourdrinier screen. Because paper making on a Fourdrinier machine is quite well known in the industry, details of the specific process will not be reported here. Generally, however, upon partial de-watering and the formation of a discrete web on the Fourdrinier screen, the paper sheet is removed from the screen and passed around a series of drier and calendering rolls to remove residual water and compress the sheet to its final desired thickness.

It should be noted that the face furnish is to be relatively free of impurities, and, particularly, that it preferably has no colorants such as pigments or dyes, or any rutile titanium or titanium oxide added. As mentioned above, because decorative paper products must be able to withstand post forming procedures such as molding, bending and other forming processes, in the past, many paper manufacturers have added significant amounts of cotton (e.g., 20–30%) to provide improved flexibility and post forming characteristics to the resulting paper sheet. However, cotton itself is relatively expensive, and includes unwanted impurities, cotton balls, and the like. Because it is preferred that face sheet 15 of the present invention have a finished ream weight of about 25 lbs. (about 41 gsm) or less, and most preferably about 20 lb (about 33 gsm), it has been found that the resultant face sheet itself, and its combination with the overlay sheet 20 of the present invention, provides a much more flexible and post forming compliant combination which does not require the addition of cotton.

As a consequence, face sheet 15 of the present invention is not only relatively lightweight, but is relatively free of colorant additives and other impurities which add to the cost, complexity, processing and application problems of conventional decorative paper sheets. In this regard, other additives commonly required in conventional face sheets for decorative products, including dispersants (e.g., discofloc), clay (often added in volumes of between 5 and 10%) and sodium aluminate, can also be obviated in the present invention. This further simplifies the paper making process, and makes the process and product more efficient and cost effective. As will also be understood, the relatively lightweight nature of face sheet 15 also enables paper making speed improvements, and it is contemplated that a face sheet of the present invention having a ream weight of about 20 lbs (33 gsm) could easily be produced on a Fourdrinier machine at speeds of 2,000–3,000 f/pm (approximately 600 to 900 meters per minute) or more, further reducing costs and increasing efficiencies.

It is contemplated that in a preferred arrangement, about 2–3% melamine formaldehyde will be included in the face furnish during the paper making process of the present invention. As the face sheet 15 completes the paper making process, it will be substantially colorless and can be inventoried as stock, colorless decorative face sheet product. Thereafter, face sheet 15 can be printed or presented to a printer for printing of a decorative layer (e.g., 82 of FIG. 4) as desired for particular decorative laminated paper products. In this regard, it is preferred that at least one of the upper and lower surfaces, 17 and 18, respectively, comprise a finished surface receptive to post-paper making decorative printing, such as gravure ink printing, silk screen printing, ink jet printing, electrostatic precipitation or the like. In many instances, it may be desirable to provide both upper and lower surfaces 17 and 18 as finished surfaces, whereby face sheet 15 can be provided with a decorative layer on one or both of such finished surfaces, as desired. Such decorative layer 82 can cover all or only a portion of a finished surface, and multiple layers could be provided, with some or all of such layers contacting and/or overlapping other layers.

Figure 4:
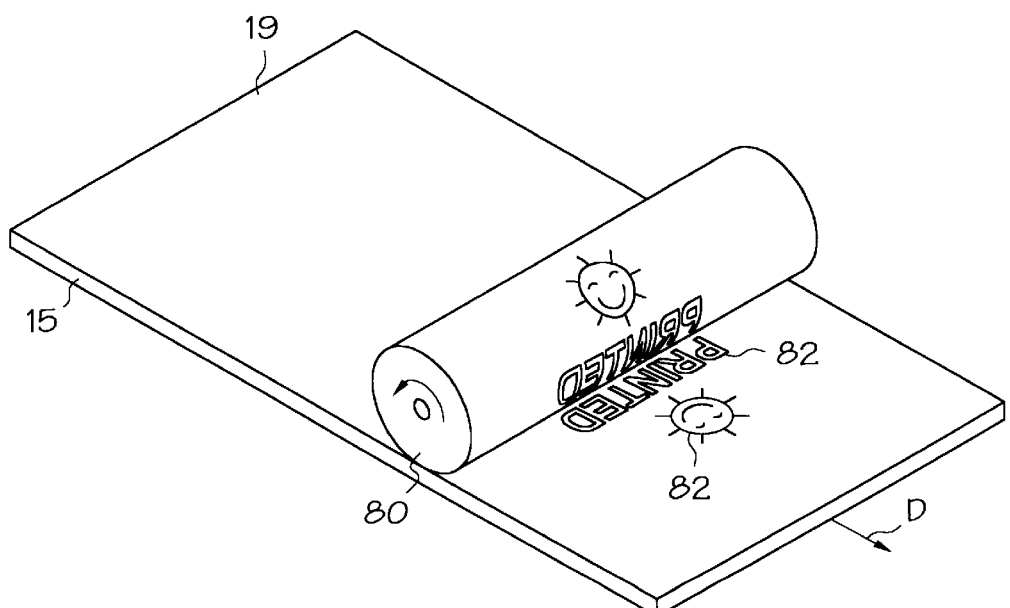
FIG. 4 is a partial perspective view of decorative printing station, showing an exemplary gravure printing operation for adding a decorative layer to a finished surface of a face sheet of the present invention.

FIG. 4 shows an exemplary arrangement where a finished surface 19 of a face sheet 15 made in accordance with the present invention is being printed with a decorative layer 82 in the form of a gravure ink printing layer or film. Obviously, decorative layer 82 can take any of a variety of forms such as solid colors, wood grains, imitation marble, stone or other materials, toned colors, printed areas, and/or combinations of colors, patterns, prints or undecorated areas. As will be appreciated, the fact that face sheet 15 is substantially colorless until provided with a decorative layer (e.g., 82) after the paper making process has been completed, emphasizes the relatively unlimited or universal nature, adaptability and applicability of face sheet 15 to any number of decorative products, and the relatively unlimited decorative characteristics which can be provided in a resulting laminated paper product without adversely affecting the paper making process itself. In fact, the paper making process and inventory control of face sheets of the present invention are substantially unaffected by the decorative requirements of the ultimate pressure laminated product.

Inventory control is quite simple in that there is only one face sheet product, which can be utilized essentially for all decorative applications, as it is simply provided with a decorative layer or layers on one or more finished surfaces (e.g., 19) at the time that a particular desired decorative finish is determined. While ink printing is the preferred manner of providing decorative layer 82, it is also contemplated that such layer can be provided in any number of similar manners, such as by silk screen, electrostatic precipitation, application of metallic and/or de-metalized decorative areas, and other decorative application methods known or conceivable by those skilled in the art. Ink printing is preferred for its simplicity, wide adaptability and availability, and for the relatively conforming and flexible characteristics of the resulting decorative layer (e.g., 82) which can accommodate post forming procedures such as molding, bending, cutting, etc. Similarly, various inks and/or decorative materials can be included in any such decorative layers 82, to provide any variety of features, such as "glowing" colors, holographic effects or other specialized characteristics.

The alpha overlay sheet 20 is essentially a protective cover or shield for the face sheet 15 in a laminated product 10 of the present invention, and is preferably designed to be extremely lightweight and to feature high quality clarity to optimize the ornamental features of an underlying face sheet. Consequently, the fiber selection for overlay sheet 20 preferably yields the best strength factor (i.e., tensile/tear relationship) while providing a sheet which is clean (i.e., has high clarity). In a preferred embodiment, a mercerized softwood Kraft pulp such as Ultranier-J (as available from ITT Rayonier Forest Products) is such a mercerized softwood Kraft which retains its bulk and porosity, and is ideally suited for the overlay sheet of the present invention.

It is preferred that overlay sheet 20 be provided with a ream weight of about 15 lbs (about 25 gsm) or less, more preferably 10 lbs (about 15 gsm) or less, and most preferably about 8 lbs (13 gsm). While the pulp formulations can, of course, be varied, it is important that the resulting face sheet be extremely lightweight and substantially clear, with good porosity. As with the face sheet 15 described above, the overlay furnish is to be substantially free of dye, pigments and rutile titanium so that the resulting overlay sheet will be provided as a substantially colorless and clear product. While prior overlay sheets generally did not include titanium, they were generally much heavier weight, as mentioned above.

Because of the unique and extremely lightweight nature of the subject overlay sheets 20, they can be manufactured on either a Yankee-type paper machine, or a conventional Fourdrinier machine, at relatively high speeds. Particularly, it is contemplated that overlay sheet 20 could be produced on a Yankee machine at speeds of approximately 3–5,000 feet per minute (approximately 900–1500 meters per minute) or more. As with the face sheet described above, overlay sheet 20 would preferably include a small amount (e.g., 2–3% by weight) of melamine formaldehyde in its furnish, and, as with the face sheet described above, no major changes to the paper making process beyond the head box would be required. In this regard, it is contemplated that significant capital investments for alterations of paper making machinery would be unnecessary in implementing the present invention, although such equipment could likely be operated at relatively high and efficient speeds.

Figure 3:
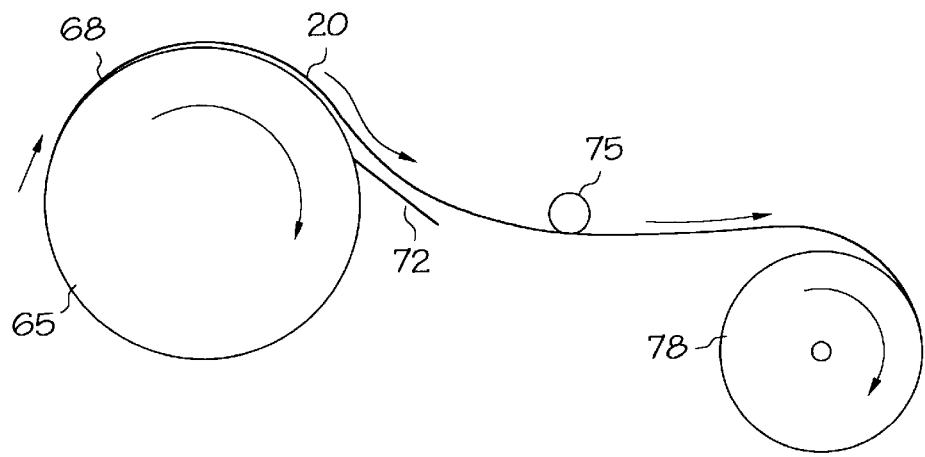
FIG. 3 is a partial schematic view of a paper making drum which can be utilized to produce the overlay sheet of the present invention in a preferred arrangement.

Once the overlay furnish is compounded and metered to the head box (e.g., 60 of FIG. 2) of the paper machine, overlay sheet 20 can be produced on either the Fourdrinier or Yankee machinery as mentioned above. FIG. 3 illustrates a preferred arrangement, wherein a Yankee heated drum 65 is provided for receiving a paper web 68 during the overlay paper making process, whereby resulting paper overlay sheet 20 is formed at relatively high speeds. In this arrangement, one modification to the standard paper making process can preferably be implemented, wherein the creping doctor blade (e.g., 72) is backed off from its normal creping position relative to heated drum 65, and a rider roll 75 is provided in place of the standard creping operation. In this way, overlay sheet 20 bypasses the creping operation, passes by rider roll 75 and to a rewinder roll 78 for take up, as creping is unnecessary for overlay sheet 20.

Laminated decorative paper product manufacturers often prefer to add an abrasive coating substance or layer in combination with the alpha or overlay sheet to provide for improved durability and wear resistance of the finished product. In this regard, aluminum oxide could be added to overlay sheet 20 via an off-line spraying procedure following completion of the paper making operations. This off-line arrangement is preferred to minimize the complications of the paper making procedure, and to allow for increased paper making speeds and efficiencies. Alternatively, aluminum oxide could be added to the overlay furnish at the fan pump (e.g., see fan pump 56 of FIG. 2), which addition could also be combined with additional application of aluminum oxide by spraying after completion of the paper making procedures. Again, the off-machine spraying technique may be preferred for overlay sheets 20, as they are extremely lightweight and the higher speeds of processing on the Yankee equipment could cause difficulties in attempting to provide a spray coating in line.

As mentioned above, once the lightweight paper face sheet 15 and lightweight paper overlay sheet 20 are made (i.e., the paper making process is completed), they can be inventoried in large quantities for future use as particular decorative laminates are identified. In this way, large runs of substantially continuous of the substantially colorless face and overlay sheets of the present invention can be made without regard to the ultimate color or decorative features of the laminated paper products. It is contemplated that these particular advantages of the present invention can enable most efficient use of paper making machinery without interruptions for specific color "runs", shut downs for color cleanup, shut downs for color matching, quality control interruptions, and/or scheduling problems to account for inventory fluctuations and demand inconsistencies.

As mentioned above, face sheet 15 is preferably provided with at least one of its surfaces 18 having a finished quality or surface (e.g., 19). Such finished surface(s) can be provided by running face sheet 15 through the nips of appropriate steel rolls at the conclusion of the paper making process in order to prepare one or more of such surfaces for printing operations. Thereafter, appropriate quantities of the face sheet 15 can be provided with one or more decorative layers (e.g., 82), such as by printing with a gravure printing roll (e.g., 80) by providing relative movement (e.g., along direction D) between a gravure printing roll (e.g., 80) and the finished surface 19 of face sheet 15. As mentioned, other manners of applying one or more decorative layers to face sheet 15 can equally be employed as appropriate.

Once the decorative finish (e.g., one or more decorative layers 82) is provided to face sheet 15, both face sheet 15 and overlay sheet 20 are preferably ran through a resin saturator, such as melamine formaldehyde, where they will pick up about 50% of their weight in resin. Thereafter, the saturated sheets are cured such as in a drying tunnel, and then cut into appropriately sized sheets for lamination. Thereafter, the cured rigid sheets are laid up in a high pressure press along with appropriate barrier and backer sheets (e.g., 30 and 35), as illustrated generally in FIG. 1.

As is known in the industry, a barrier sheet is generally provided of relatively mid to heavy basis weight paper (e.g., about 40 to 95 lbs per ream, or about 65 to 155 gsm) depending upon the opacity needed to enhance the ornamental characteristics of a face sheet. Barrier furnish can vary from about 100% Kraft softwood to about 75% hardwood and 25% softwood. Generally, the sole purpose of the barrier sheet is to impart opacity to the face sheet and to protect the face sheet from the phenolic treatment of the lower placed backer sheets 35. It has been found however, that as a result of the unique and efficient characteristics of the present invention, the amount of titanium added to the barrier sheet to provide additional opacity (conventionally between about 40–60%) can be significantly reduced in laminated products herein. For example, it is contemplated that levels of rutile titanium dioxide can preferably be reduced to much lower levels (e.g., between about 20–30%), further reducing complexity and cost.

Particularly, as is also common in the industry, backer sheets are generally provided in the form of phenolic Kraft paper materials. The phenolic resin materials are lower cost and generally lower grade than the melamine formaldehyde resins, and the barrier sheet serves to prevent migration of the phenolic into the upper portions of the laminate. During the application of heat and pressure of lamination process, the melamine and phenolic act as adhesive to bond the various layers into a completed laminated decorative paper product (e.g., 10). Following completion of the lamination process, the completed decorative product 10 can be cut to size and/or list-formed or molded into a variety of shapes and conformations. As mentioned above, due to the improved flexibility of the lightweight face and overlay sheet combination of the present invention, as well as the relative flexibility and performing nature of printed decorative layer or layers 82, decorative products (e.g., 10) made in accordance with the present invention feature improved post-forming reliability with minimal cracking and waste in the process. It should also be emphasized that the provision of relatively high finishes (19) to one or more surfaces of face sheet 15 provides the added benefit of excellent hold out of the decorative layer (e.g., inks and pigments), while at the same time providing paper sheets which feature excellent saturating properties for receiving and holding the bonding resin such as melamine formaldehyde.

Having shown and described the preferred embodiments of the present invention, further adaptions of the lightweight paper face sheet and overlay sheet, their combination, the resulting laminated paper products, and/or the method for providing an improved laminated decorative paper product of the present invention can be accomplished by appropriate modification by those of ordinary skill in the art without departing from the scope of the present invention. A number of alternatives and modifications have been described herein, and others will be apparent to those skilled in art. For example, selection of the pulp quality and specific pulp ingredients for the face and overlay furnishes can be redefined as desired to provide more economical products or special functional characteristics in particular circumstances. Accordingly, the scope of the present invention should be considered in terms of the following claims, and is understood not to be limited to the details of the structures and methods shown and described in the specification and drawings.

What is claimed is:

1. A lightweight paper face sheet for laminated decorative paper products, said face sheet comprising a ream weight of 50 pounds or less and formed from a furnish substantially free of dye, pigments and rutile titanium, and having at least one finished surface receptive to the application of a post-paper making decorative layer for selective decorative presentation.

2. The paper face sheet of claim 1, wherein said face sheet comprises a ream weight of about 25 pounds or less.

3. The paper face sheet of claim 1, wherein said face sheet comprises a ream weight of about 20 pounds or less.

4. The paper face sheet of claim 3, wherein said furnish further comprises a mercerized hardwood pulp for providing increased absorbency and uniformity of resin saturation.

5. The paper face sheet of claim 1, wherein said furnish comprises bleached softwood pulp which provides wet strength with minimum refining.

6. The paper face sheet of claim 5, wherein said bleached softwood pulp comprises Hinton High Bright or Domtar Q-90 virgin pulp.

7. The paper face sheet of claim 5, wherein said furnish further comprises mercerized hardwood pulp.

8. The paper face sheet of claim 1, wherein said furnish comprises about 30 percent bleached softwood pulp, about 35 percent mercerized hardwood pulp, and about 35 percent Eucalyptus pulp.

9. The paper face sheet of claim 8, further comprising a wet strength material in an amount of about 3 percent by weight or less.

10. The paper face sheet of claim 1, further comprising a decorative layer of ink printed on said finished surface.

11. A paper face and overlay sheet combination for use in forming laminated decorative products, said combination comprising:
   a lightweight paper face sheet for laminated decorative paper products, said face sheet being formed from a face furnish substantially free of dye, pigments and rutile titanium, and having at least one finished surface receptive to post-paper making application of a decorative layer; and
   a substantially clean and clear, lightweight paper overlay sheet formed from an overlay furnish substantially free of dye, pigments and rutile titanium, both of said face and overlay sheets being substantially colorless prior to application of the decorative layer to said one or more finished surfaces of said face sheet.

12. The face and overlay sheet combination of claim 11, further comprising a decorative layer applied to a finished surface of said face sheet.

13. The face and overlay sheet combination of claim 11, wherein said overlay furnish comprises a mercerized softwood kraft pulp.

14. The face and overlay sheet combination of claim 11, wherein said overlay sheet further comprises an abrasive additive.

15. The face and overlay sheet combination of claim 11, wherein said face sheet comprises a ream weight of about 25 pounds or less.

16. The face and overlay sheet combination of claim 15, wherein said overlay sheet comprises a ream weight of about 20 pounds or less.

17. The face and overlay sheet combination of claim 11, wherein said face furnish comprises about 30 percent bleached softwood pulp, about 35 percent mercerized hardwood pulp, and about 35 percent Eucalyptus pulp.

18. The face and overlay sheet combination of claim 11, wherein said overlay sheet has a ream weight of about 15 pounds or less.

19. A pressure laminated decorative paper product comprising:
   a lightweight paper face sheet for laminated decorative paper products, said face sheet comprising a ream weight of 50 pounds or less and being formed from a face furnish substantially free of dye, pigments and rutile titanium, and having at least one finished surface receptive to post-paper making application of a decorative layer;

a paper overlay sheet located above said face sheet in the laminated product, said overlay sheet having a ream weight of less than about 15 lbs.;

a barrier sheet arranged below said face sheet in the laminated product;

one or more backer sheets arranged below said barrier sheet; and a decorative layer on said finished surface of said face sheet to provide selective decorative effects.

20. The laminated product of claim 19, wherein said paper overlay sheet is formed from an overlay furnish substantially free of dye, pigments and rutile titanium.

21. The laminated product of claim 19, wherein said face sheet comprises a ream weight of about 25 pounds or less.

22. The laminated product of claim 19, wherein said decorative layer comprises ink printed on at least one finished surface of said face sheet.

23. The laminated product of claim 19, wherein said overlay sheet has a ream weight of about 10 pounds or less.

24. A method for forming a laminated decorative paper product, comprising the following steps:

providing a lightweight paper face sheet for laminated decorative paper products, said face sheet comprising a ream weight of 50 pounds or less and being formed from a face furnish substantially free of dye, pigments and rutile titanium, and having at least one finished surface receptive to post-paper making application of a decorative layer;

providing a lightweight paper overlay sheet located above said face sheet in the laminated product, said overlay sheet having good tensile and tear strength and being formed from an overlay furnish substantially free of dye, pigments and rutile titanium;

applying a decorative layer to at least a portion of at least one finished surface of said face sheet;

saturating both the face and overlay sheets with resin;

curing the saturated face and overlay sheets; and laminating the face and overlay sheets.

25. The method of claim 24, further comprising providing said overlay furnish with a mercerized softwood kraft pulp, and wherein said overlay sheet is provided with a ream weight of about 15 pounds or less.

26. The method of claim 24, wherein said overlay sheet is produced at speeds of 3000 feet per minute or more.

27. The method of claim 24, wherein said face sheet is produced at speeds of 2000 feet per minute or more.

28. The method of claim 24, further comprising the step of adding a coating of abrasive material to said overlay sheet apart from the paper making machine.

29. The method of claim 24, wherein said step of providing said face sheet comprises adding a wet strength material prior to saturating said face sheet.

30. The method of claim 24, further comprising providing said face sheet with a ream weight of about 25 pounds or less.

31. The method of claim 24, wherein said step of applying a decorative layer comprises ink printing.

32. The method of claim 24, wherein said face sheet is formed from a blend of softwood and mercerized hardwood.

33. The method of claim 24, wherein said paper face sheet is provided with a ream weight of about 25 pounds or less.

34. The method of claim 33, wherein said paper overlay sheet is provided with a ream weight of about 20 pounds or less.

35. The method of claim 24, wherein the step of applying a decorative layer to said face sheet is undertaken after said at least one finished surface is provided to said face sheet.

* * * * *